United States Patent
Renegar et al.

(10) Patent No.: US 10,422,723 B2
(45) Date of Patent: Sep. 24, 2019

(54) FIXTURE AND METHOD OF TESTING VEHICLE WHEEL VIBRATION

(71) Applicant: Superior Industries International, Inc., Southfield, MI (US)

(72) Inventors: Henry Lee Renegar, Fayetteville, AR (US); Chris Reynolds, Farmington, AR (US); Timothy Wayne Hood, Fayetteville, AR (US)

(73) Assignee: Superior Industries International, Inc., Southfield, MI (US)

( * ) Notice: Subject to any disclaimer, the term of this patent is extended or adjusted under 35 U.S.C. 154(b) by 97 days.

(21) Appl. No.: 15/613,591

(22) Filed: Jun. 5, 2017

(65) Prior Publication Data

US 2018/0003591 A1    Jan. 4, 2018

Related U.S. Application Data

(60) Provisional application No. 62/345,185, filed on Jun. 3, 2016.

(51) Int. Cl.
*G01M 17/013* (2006.01)
*G01M 7/02* (2006.01)
*B60B 3/16* (2006.01)

(52) U.S. Cl.
CPC .......... *G01M 17/013* (2013.01); *G01M 7/027* (2013.01); *B60B 3/16* (2013.01)

(58) Field of Classification Search
CPC .. G01M 17/013; G01M 17/02; G01M 17/027; B60B 3/16
USPC .................... 73/573, 662, 663, 669
See application file for complete search history.

(56) References Cited

U.S. PATENT DOCUMENTS

| | | | | |
|---|---|---|---|---|
| 3,371,450 | A | * 3/1968 | Board, Jr. | ............... B24B 41/04 451/343 |
| 4,148,348 | A | 4/1979 | French et al. | |
| 4,763,515 | A | * 8/1988 | Pielach | ............... G01M 17/022 157/16 |
| 4,925,248 | A | 5/1990 | Aderer | |
| 5,502,951 | A | 4/1996 | Oliverio et al. | |
| 5,691,477 | A | * 11/1997 | Di Bernardo | ......... G01M 7/045 73/662 |
| 2004/0102880 | A1* | 5/2004 | Brown | ................ G01M 17/013 701/31.4 |

(Continued)

FOREIGN PATENT DOCUMENTS

GB    1221110 A    2/1971

OTHER PUBLICATIONS

International Search Report and Written Opinion of related WO Application No. PCT/US2017/035907, dated Sep. 5, 2017.

*Primary Examiner* — Natalie Huls
*Assistant Examiner* — Suman K Nath
(74) *Attorney, Agent, or Firm* — Miller Canfield

(57) ABSTRACT

A fixture for testing stiffness of a vehicle wheel by measuring vibration of the wheel includes a base and a retention member. The retention member is integral to the base. The retention member defines a distal end including a distal diameter and a proximal end being proximate to the base and including a proximal diameter. The proximal end includes a plurality of studs extending upwardly therefrom for being received by lug apertures defined by the vehicle wheel thereby securing the vehicle wheel to the retention member. The distal diameter includes a ratio to the proximal diameter of between 0.6 to 0.8 to one.

11 Claims, 3 Drawing Sheets

(56) References Cited

U.S. PATENT DOCUMENTS

| | | | |
|---|---|---|---|
| 2009/0308156 A1* | 12/2009 | Sumimoto | G01M 1/045 73/462 |
| 2010/0126262 A1* | 5/2010 | Czoka | G01M 17/04 73/117.03 |
| 2016/0223431 A1* | 8/2016 | Summers | G01M 17/013 |
| 2017/0276570 A9* | 9/2017 | White | B60C 23/0433 |

* cited by examiner

FIXTURE AND METHOD OF TESTING VEHICLE WHEEL VIBRATION

PRIOR APPLICATIONS

The present application claims priority to U.S. Provisional Patent Application No. 62/345,185 filed Jun. 3, 2016, the contents of which are incorporated herein by reference.

TECHNICAL FIELD

The present invention relates generally toward an apparatus for predicting performance characteristics of a cast alloy wheel. More specifically, the present invention relates toward a fixture having improved predictive properties for measuring vibration resonance and stiffness of a wheel.

BACKGROUND

Various components of a motor vehicle can impact occupant experience more so than others. For example, cast alloy wheels are capable of either resonating translation of noise or reducing translation of noise to a passenger compartment of the motor vehicle. When traveling over rough road surfaces, wheels are prone to vibrate, which is known to translate vibration resonance throughout the passenger compartment by way of the axles. Also, noise generated by the interaction of the tire with the road surface can generate vibrations of the gases inside the tire cavity between the tire and the wheel rim. This vibration inside the tire cavity is known to be transmitted through the wheel and into other vehicle components and eventually into the occupant space of the vehicle. In addition to occupant dissatisfaction, high levels of vibration are known to cause failure to various vehicle components.

While mathematic modeling is sometimes used to predict the propensity of a wheel to vibrate by modeling stiffness of a particular wheel configuration, mathematical modeling in this instance has limits. It is still necessary to physically test a wheel to determine the wheels propensity to vibrate, which is also indicative of stiffness of the wheel. One method of determining propensity of a wheel to translate vibration is to mount a wheel on a fixture by striking the wheel to measure propensity of the wheel to translate vibration. However, little thought has gone into adverse implications of a poorly designed fixture upon test results. For example, the fixture that has been poorly designed is prone to also vibrate, which is known to skew test data of the wheel. Therefore, it would be desirable to design a fixture for testing propensity of a wheel to translate vibration, where the fixture has no adverse contribution to the test results.

SUMMARY

A fixture for testing stiffness of a vehicle wheel by measuring vibration of the wheel includes a base and a retention member. The retention member is integral with the base for retaining the wheel to the fixture for testing propensity of the wheel to vibrate. The retention member defines a distal end and a proximal end. The distal end includes a distal diameter and the proximal end includes a proximal diameter. The proximal end is proximate to the base while the distal end is spaced from the base. A plurality of studs extend upwardly from the proximal end and are received by lug apertures defined by the vehicle wheel for securing the vehicle wheel to the retention member. The distal diameter defines a ratio to the proximal diameter of between 0.6 to 0.8 to 1.

The unique configuration of the fixture provides more reproducible results not capable of the prior art fixtures. Known prior art fixtures cause a significant amount of "noise" in the test data in the form of amplitude oscillation in the low frequency range between 0 Hz and 300 Hz, and more particularly within the range of 100 Hz and 210 Hz. The smooth curve within the range of 100 Hz and 210 Hz shows the test results as performed on the fixture of the present invention. A curve that shows wide swings represents the test result on the same wheel when performed on a prior art fixture that is widely used. The wide swings or reverberation are caused from vibration resonating through the fixture back into the wheel causing errors in the test results. The only way to account for the reverberation is to attempt to subtract input vibration from output vibration which is not efficient and not very accurate.

Even worse, the prior art fixtures resonate vibration in the most relevant frequency range when determining if a wheel has an unacceptable propensity to vibrate. Using the fixture of the present invention, it is no longer necessary to subtract input from output when attempting to correct for the noise caused from the prior art fixture. For the first time, accurate test data is achievable in a reproducible and reliable manner. The fixture of the present invention reduces noise contribution to the test data at low end frequencies most relevant to evaluating vibration characteristics of a wheel by 70-80% providing for improved evaluation in this critical range.

BRIEF DESCRIPTION OF THE DRAWINGS

Other advantages of the present invention will be readily appreciated as the same becomes better understood by reference to the following detailed description when considered in connection with the accompanying drawings, where.

DETAILED DESCRIPTION

Figure 1:
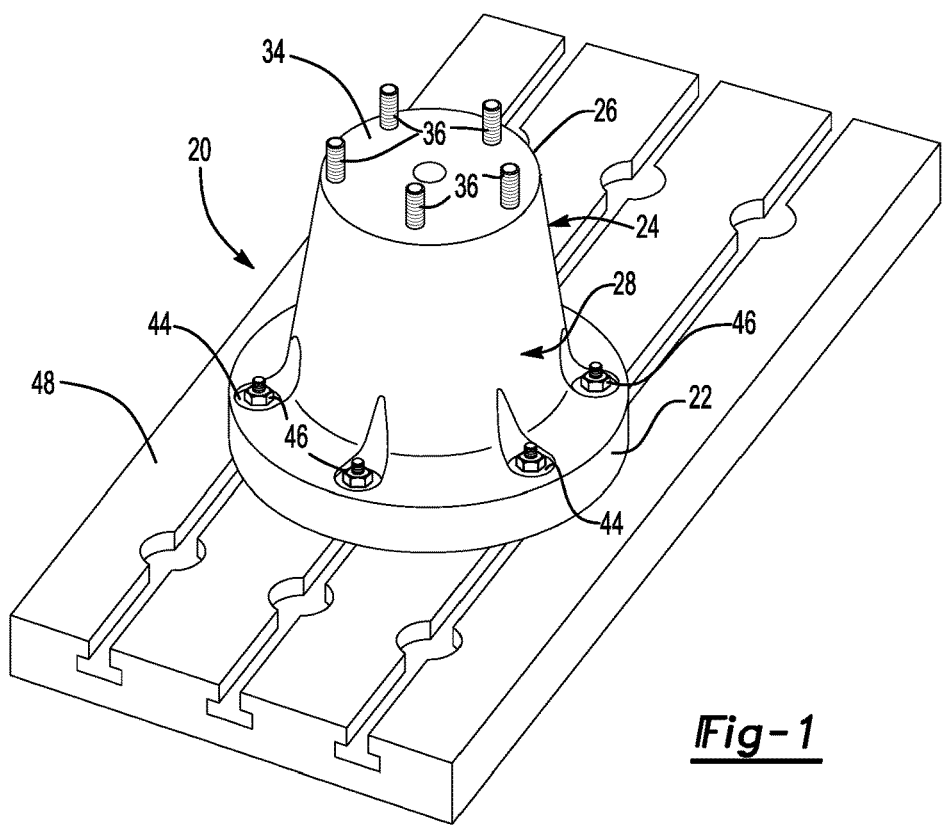
FIG. 1 shows a perspective view of the fixture of the present invention.

Referring to FIG. 1, the fixture of the present invention is generally shown at 20. The fixture 20 includes a base 22 from which a retention member 24 extends. The retention member includes a distal end 26 and a proximal end 28. The proximal end 28 is located proximate the base 22. The distal end 28 is spaced from the base 22 for supporting a wheel as will be explained further herein below.

Figure 2:
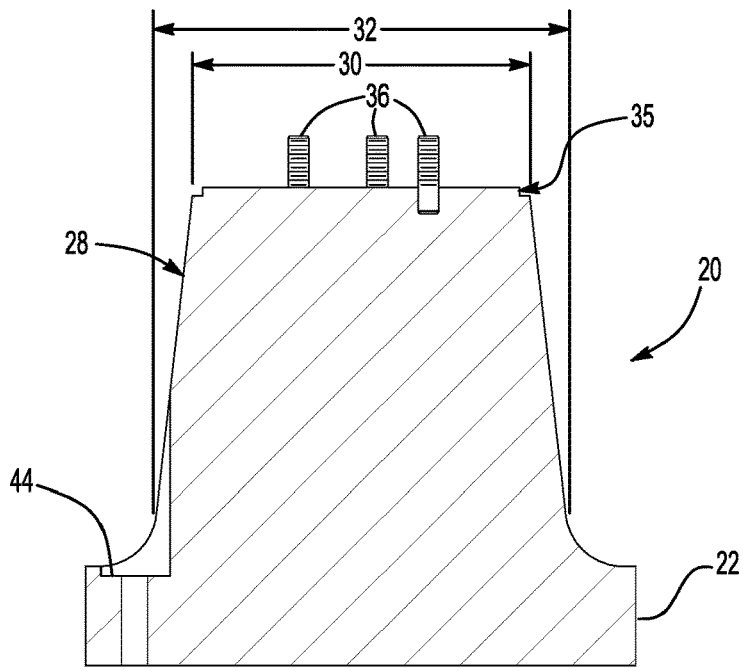
FIG. 2 shows a cross-sectional view of the fixture of the present invention.

As best represented in FIG. 2, the distal end 26 defines a distal diameter 30 and the proximal end 28 defines a proximal diameter 32. In one embodiment, a ratio between the distal diameter 30 and the proximal diameter 32 ranges between 0.6 and 0.8 to 1. In another embodiment, the ratio between the distal diameter 30 and the proximal diameter 32 is about 0.77 to 1.

Figure 5:
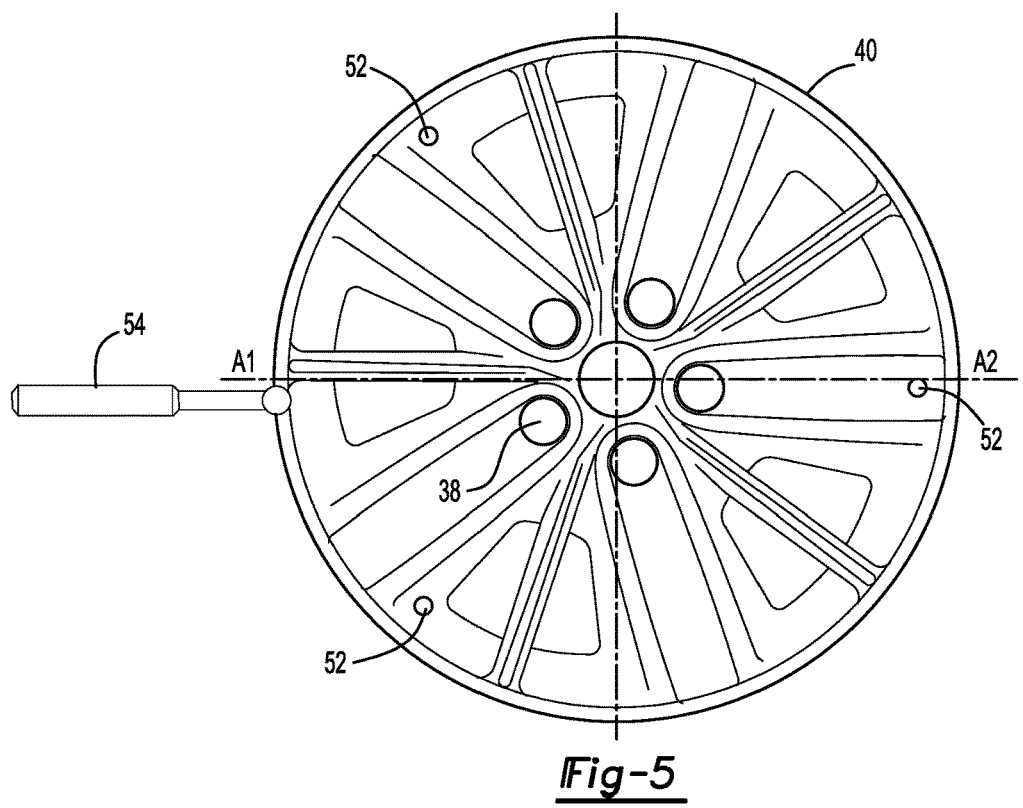
FIG. 5 shows a wheel mounted on the fixture that is prepared for vibration testing with a instrumented force hammer.

Referring again to FIG. 1, the distal end 26 also defines a face 34 onto which a wheel subject to vibration and stiffness testing is supported. The face 34 is oriented substantially horizontal, and perpendicular to an axis a defined by the fixture 20. A plurality of studs 36 extend upwardly from the face 34. Each of the plurality of studs 36 is received by a lug aperture 38 defined by a wheel 40 as best represented in FIG. 5. A lug nut (not shown) is threadably engaged with each stud 36 and secures the wheel 40 to the fixture 20. It is desirable to secure the wheel 40 to the fixture 20 with a substantially same torque being applied to each lug nut as would be used to secure the wheel 40 to a vehicle axle. Therefore, the propensity of vibration being translated from the wheel 40 through the axle can be evaluated in an accurate manner.

Figure 3:
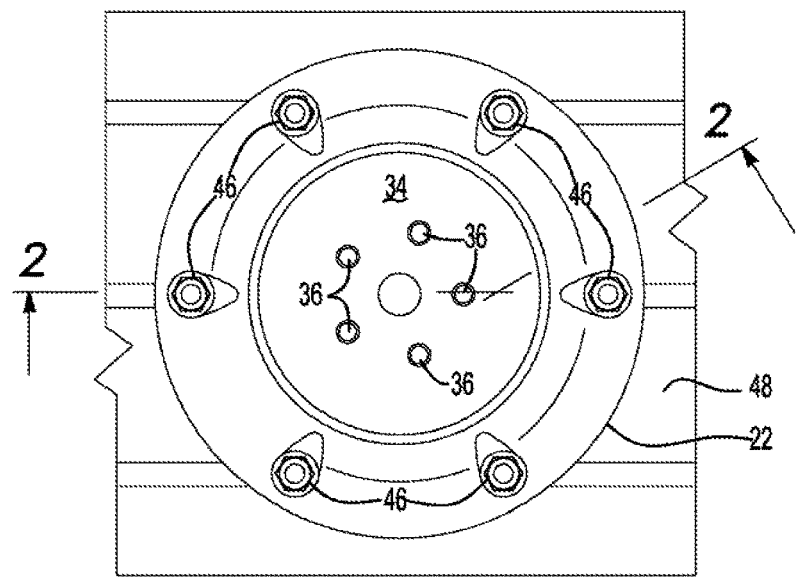
FIG. 3 shows a plan view of the fixture of the present invention.
Figure 4:
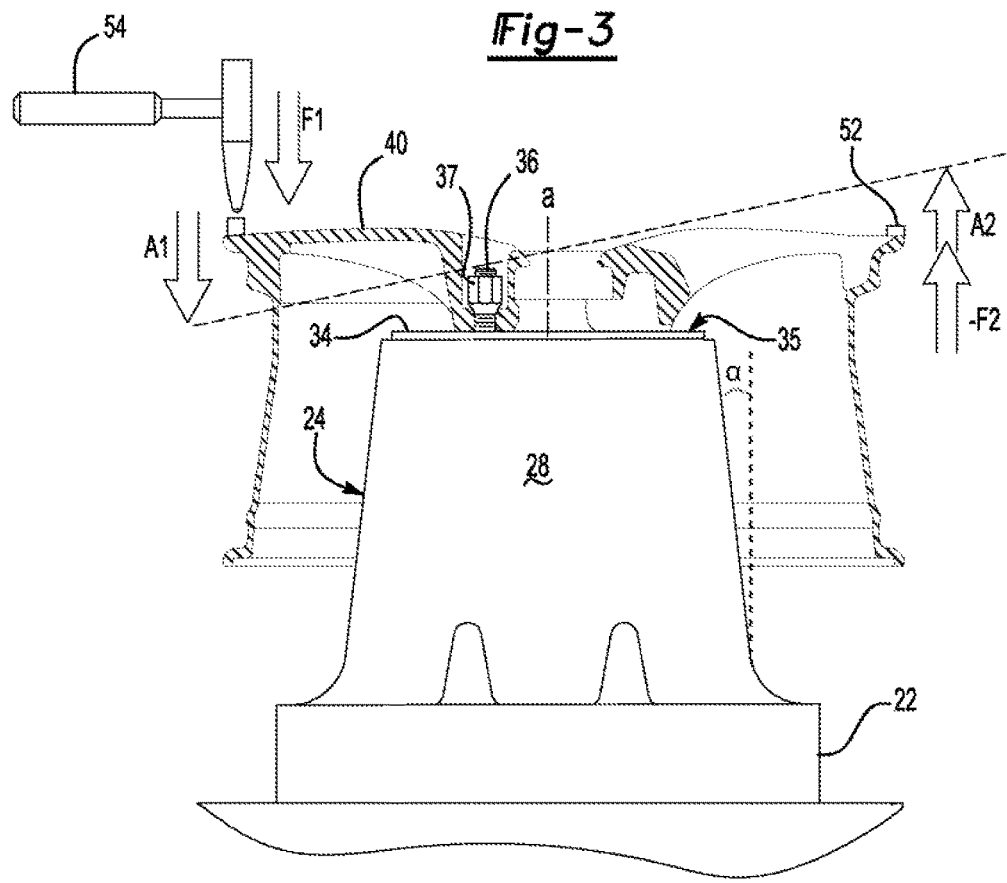
FIG. 4 shows a plan view of the fixture mounted on a bed plate.

In one embodiment, the face 34 is part of a face plate 35 (FIG. 3) that is fastened to the retention member 24. In this embodiment, the studs 36 are secured to or extend through the face plate 35 and the face plate 35 is subsequently affixed to the retention member 24. In an alternative embodiment, as set forth above, the fixture 20 is monolithic and the studs 36 are individually attached to the face 34 of the retention member 24.

The retention member 24 is further defined by a frustoconical wall 28 having an angle α to the axis a defined by the fixture 20 of between about 6" and 8". In a further embodiment, frustoconical wall includes an angle α to the axis a defined by the fixture 20 of 7.3". The configuration of the retention member 24 of the present invention has removed the fixture 20 from adversely affecting the data. However, the precise angle α, of the frustoconical wall 28 can be optimized for a particular wheel size and configuration. Likewise, the ratio of the distal diameter 30 to the proximal diameter 32 may also be optimized for a particular wheel size and configuration. Through optimization, the face 34 is the only part of the retention member 24 to contact the wheel 40.

The base 22 of the fixture 20 defines a plurality of base apertures 44, each of which is configured to receive a base fastener 46 for securing the fixture 20 to a bed plate 48. The bed plate 48 includes a size, mass and dimension necessary for providing stabilization to the base 22 of the fixture 20 while testing the wheel 40. Securing the fixture 20 to the bed plate 48 reduces probability of the interface between the fixture 20 and the bed plate 48 affecting the test data.

Referring again to FIG. 5, the fixture 20 receives the wheel 40 such that the face 34 engages a rear surface of the wheel 40 in the same manner as does an axle of a vehicle. As set forth above, only the face 34 of the fixture 20 contacts the wheel 40. During testing, the wheel 40 rests upon the face 50 of the retention member 24 such that the axis of the wheel is substantially vertical and coaxial with the fixture axis a. The studs 36 are received by lug apertures 38 defined by the wheel 40 and lug nuts (not shown) are torqued on the studs 36 to secure the wheel to the fixture 20. The torque used to tighten the lug nuts to the studs 36 is substantially the same as that used to secure a wheel to an axle to mirror commercial assembly.

Figure 6:
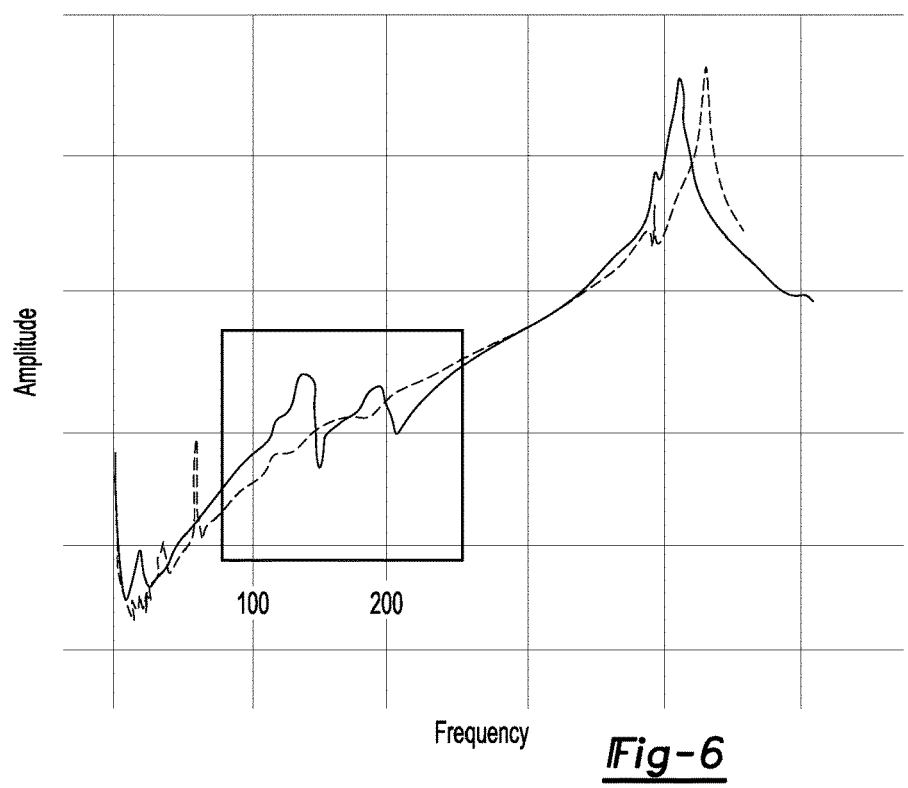
FIG. 6 shows a graph comparing vibration test data of the prior art fixture plotted against vibration test data of fixture of the present invention.

Once the wheel 40 is secured to the fixture 20, a sensor 52 is affixed to the wheel to measure vibration. In another embodiment, a plurality of sensors 52 is affixed to the wheel to measure vibration at spaced locations. Once the sensor(s) 52 are placed in position on the wheel 40, an instrumented force hammer 54 is used to strike the wheel 40 in a vertical direction as indicated by arrow F1 at a location spaced from the sensor(s) 52. In one embodiment, the sensors sense acceleration (or displacement) in the direction of arrows A1 of FIG. 5. The response which is identified in the direction of arrow A2 is the first phase of the oscillation that is indicative of vibration of the wheel 40. The arrow identified by −F2 is indicative of the force opposite force around a pivot point of the wheel 40 from the location the wheel is struck by the hammer 54. The vibration characteristics of the wheel 40 are measured in amplitude (m/s$^2$) against Frequency (Hz) and charted as shown in FIG. 6. In other embodiments, alternative sensors 52 capable of measuring vibration are used including light sensors, piezo sensors, accelerometers and the like.

The most relevant portion of the chart shown in FIG. 6 with respect to adverse implications of wheel vibration is charted between about 80 Hz and 300 Hz. In this range, the inventors have determined, it is most important to eliminate as much noise or false vibration translation generated by the fixture 20 as possible. To eliminate skewed test results, it is desirable to eliminate or substantively reduce any contribution or reduction to amplitude in the most relevant frequency range.

FIG. 6 shows two data sets. The solid line represents test data from a prior art fixture. Between about 125 Hz and 210 Hz a significant amount of chatter occurs as is evident by the oscillation in amplitude. This oscillation is attributed to the prior art fixture reverberating vibration through the wheel 40, which is detected by the sensor 52 as wheel vibrates. If this oscillation was attributed only to a wheel being tested it would represent an unacceptable level of vibration of the wheel. The solid line shown in FIG. 6 represents a smooth progression of data between about 125 Hz and 210 Hz, which represents vibration attributed to the same wheel 40 tested on the fixture 40 of the present invention.

Therefore, the fixture 20 of the present invention does not interfere in any substantive manner with the test data as is represented by a smooth curve through the most relevant range, which indicates the fixture 20 has introduced no noise into the test data. The significance of this result is that more accurate and more reproducible test results can now be achieved without having to estimate the amount of a noise generated by the test fixture.

The invention has been described in an illustrative manner, and is to be understood that the terminology which has been used is intended to be in the nature of words of description rather than of limitation. It is now apparent to those skilled in the art that many modifications and variations of the present invention are possible in light of the above teachings. It is, therefore, to be understood that the invention may be practiced otherwise and is specifically described, and still be within the scope of the present application.

What is claimed is:

1. A fixture assembly for testing stiffness of a vehicle wheel by measuring vibration of the wheel, comprising:
   a base;
   a retention member being integral to said base for retaining the wheel to said fixture; said retention member defining a distal end including a distal diameter and a proximal end being proximate to said base and including a proximal diameter;
   said distal end defining a face including a plurality of studs extending upwardly therefrom for being received by lug apertures defined by the vehicle wheel thereby securing the vehicle wheel to said retention member;

a plurality of sensors spaced around the wheel from an impact location for measuring amplitude and frequency associated with vibration resulting from a test strike upon the wheel; and said distal diameter including a ratio to said proximal diameter providing a frustoconical configuration to said retention member.

2. The fixture assembly set forth in claim 1, wherein each of said studs extending upwardly from said distal end includes helical threads for threadably receiving a lug nut for securing the wheel to said fixture.

3. The fixture assembly set forth in claim 1, wherein said ratio of said distal diameter of said distal end to said proximal diameter of said proximal end is between 0.6 to 0.8 to one.

4. The fixture assembly set forth in claim 1, wherein said retention member presents a frustoconical wall circumscribing an axis defined by said retention member and said frustoconical wall defines an angle to said axis of between six and eight degrees.

5. The fixture assembly set forth in claim 1, wherein said retention member presents a frustoconical wall circumscribing an axis defined by said retention member and said frustoconical wall defines an angle to said axis of 7.3 degrees.

6. The fixture assembly set forth in claim 1, further including a bed plate and said base is fixedly attached to said bed plate.

7. The fixture assembly set forth in claim 1, wherein said base includes a plurality of apertures each receiving a fastener for fixedly attaching said base to said bed plate.

8. The fixture assembly set forth in claim 1, wherein said distal end of said retention member defines a face for supporting the wheel when the wheel is secured to said retention member with said studs.

9. The fixture assembly set forth in claim 1, wherein only a face of said retention member in disposed in physical contact with the wheel while measuring vibration of the wheel.

10. The fixture assembly set forth in claim 1, wherein said base and said retention member define a monolithic construction.

11. The fixture assembly set forth in claim 1, wherein said ratio of said distal diameter of said distal end to said proximal diameter of said proximal end is 0.77 to one.

* * * * *